A. LEE.
COLLAPSIBLE EGG CRATE.
APPLICATION FILED JUNE 18, 1913.
1,106,228.
Patented Aug. 4, 1914.
2 SHEETS—SHEET 2.
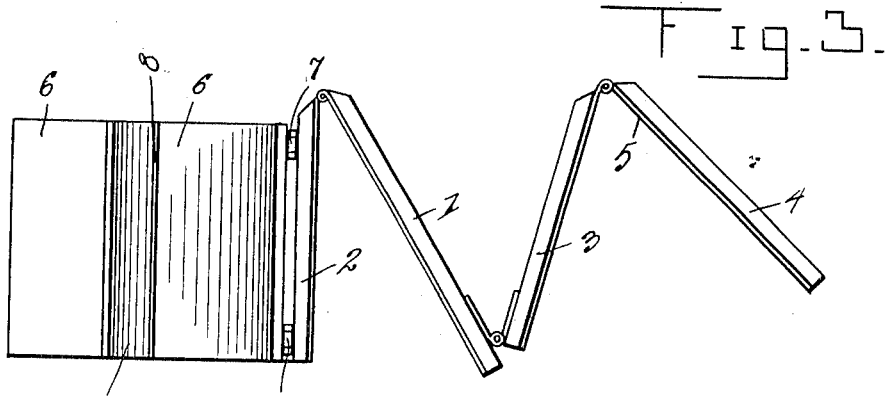
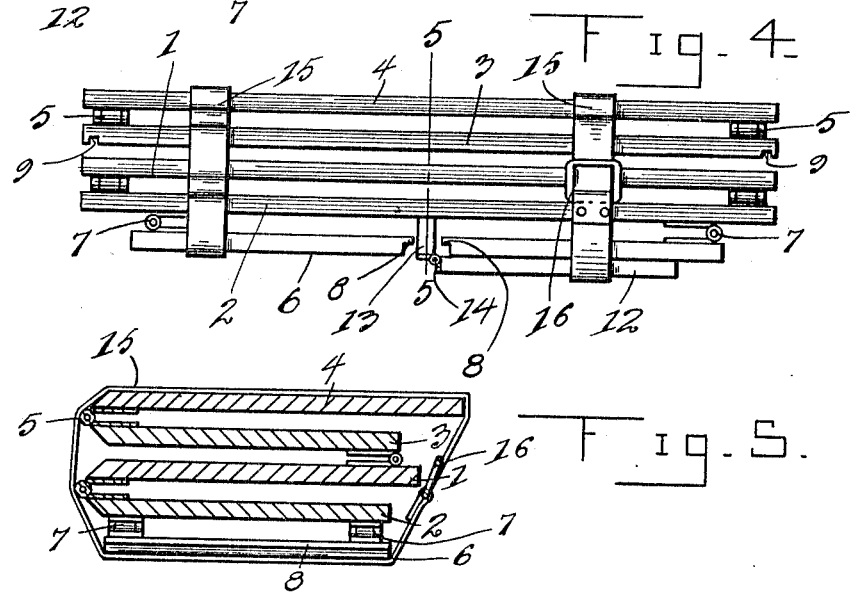
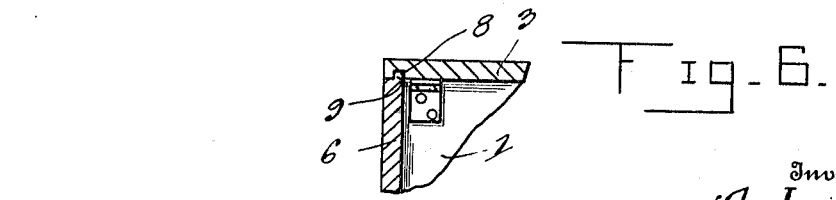
Witnesses
C. R. Bealle.
H. Kaye Martin
Inventor
A. Lee.
By
Attorney
THE NORRIS PETERS CO., PHOTO-LITHO., WASHINGTON, D. C.

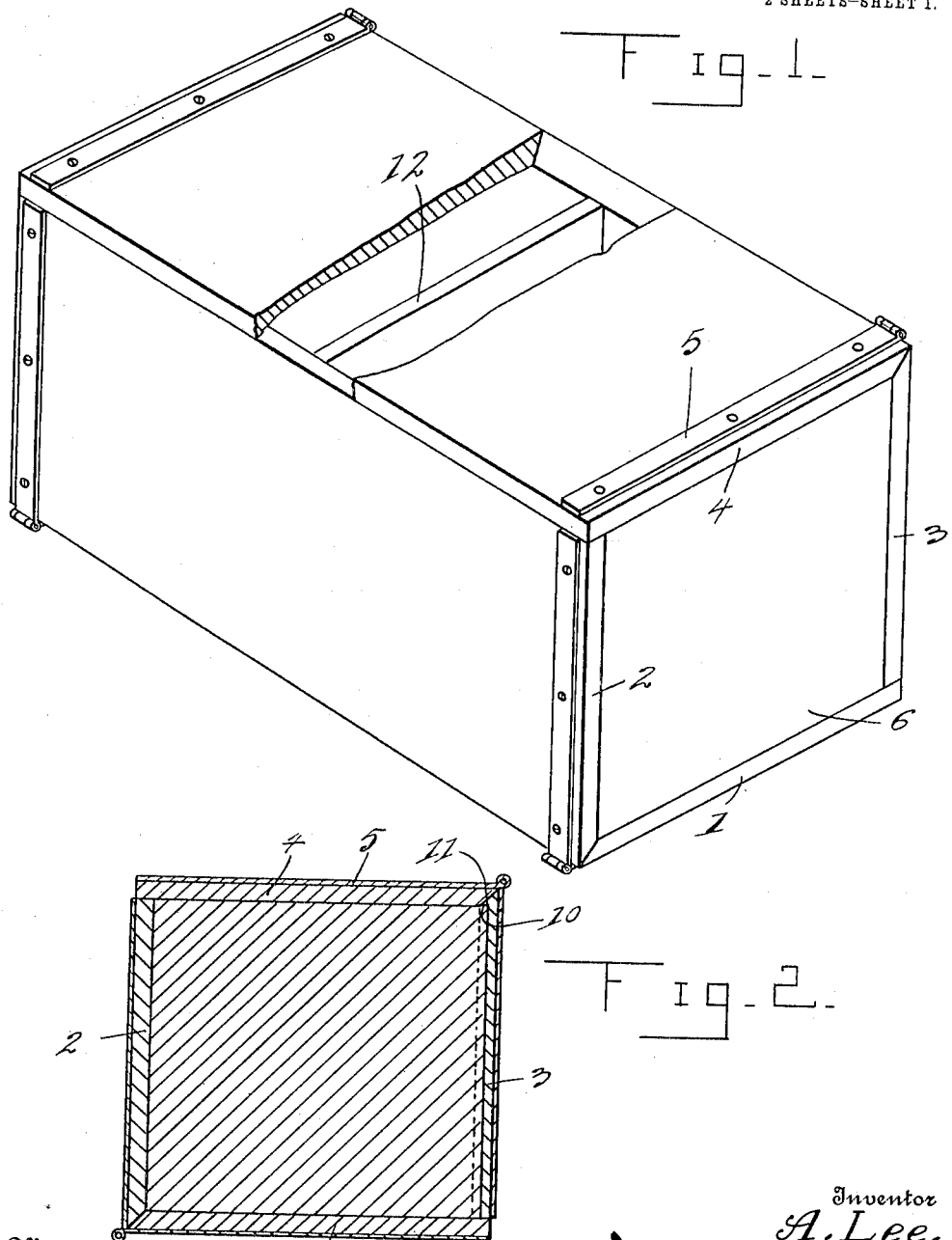

UNITED STATES PATENT OFFICE.

ANDERSON LEE, OF SALT LAKE CITY, UTAH.

COLLAPSIBLE EGG-CRATE.

1,106,228.     Specification of Letters Patent.     Patented Aug. 4, 1914.

Application filed June 18, 1913. Serial No. 774,451.

*To all whom it may concern:*

Be it known that I, ANDERSON LEE, a citizen of the United States, residing at Salt Lake City, in the county of Salt Lake and State of Utah, have invented certain new and useful Improvements in Collapsible Egg-Crates; and I do hereby declare the following to be a full, clear, and exact description of the invention, such as will enable others skilled in the art to which it appertains to make and use the same.

This invention relates to new and useful improvements in collapsible egg crates and has for its object to provide a device which may be easily and quickly folded and put in condition for transportation.

Another object of my invention is to provide a means to automatically secure the crate in its position for reception of the contents.

With the above and other objects in view I now proceed to describe my invention in the following specification and accompanying drawings, in which:

Figure 1 is a view in perspective of my improved egg crate. Fig. 2 is a transverse sectional view of my improved egg crate. Fig. 3 is an end view of my improved egg crate as it would appear when being partially folded. Fig. 4 is a view of my egg crate in its collapsed position. Fig. 5 is a transverse sectional view taken on line 5—5 of Fig. 4, and Fig. 6 is a detail sectional view of a fragment of my improved egg crate showing the locking means.

Referring to the drawings by characters of reference 1 indicates the bottom of my improved egg crate having hingedly secured thereto a front 2. Along the opposite edge of the bottom I preferably provide hinges which are adapted to be secured thereto, and provide a means to hold the back 3 in coöperative relation. A top 4 is hinged to the back as clearly illustrated in Fig. 1 and the hinges which are used on the outside are preferably extended, as clearly illustrated at 5, to form a reinforcing strap.

At each end of the front wall 2 I provide the end walls 6 which are hingedly secured thereto by means of the hinges 7, as clearly illustrated in Fig. 3. The ends are preferably provided at their extremities opposite the hinges with tongues 8 extending parallel therewith and the use of which will be more fully hereinafter described.

Immediately adjacent the hinges which secure the back wall to the bottom and intermediate said hinges and the ends of the back wall I provide the transversely extending grooves 9 which terminate a short distance from the upper extremity of the back wall, as clearly illustrated at 10 and form over-hanging shoulders 11, against which the upper extremities of the tongues 8 are adapted to abut when the device is in position for reception of the contents.

A central partition wall 12 is hinged to the upstanding and transversely extending rib 13 by means of the hinges indicated by the numeral 14.

It will be obvious from the foregoing that when it is desired to make use of my improved egg case, assuming the same to be in its folded position, the first operation is the swinging of the back to its upright position with relation to the bottom, the end walls are then swung outwardly with the front and it will be clearly seen that upon bringing the front in proper relation with the bottom the tongues 8 will enter the slots 9 and the upper ends thereof will pass beneath the shoulder 11 thereby slightly springing the back outwardly and causing the same to give slightly during the passage of the tongue. After the tongue has been entirely pressed into the slot the back will spring inwardly and bring the upper terminal of the slot, indicated by the numeral 10, in such position that the shoulder 11 will over-lie the upper end of the tongue and thereby hold the same from accidental displacement. When the device has assumed this position it will be obvious that it will be in condition for the reception of its contents and the top 4 may be swung downwardly and fastened by any proper means. In returning the device to its folded position the top is swung rearwardly against the back wall and it will be seen that upon springing the front and rear walls apart the rear wall will give slightly and permit the upper end of the tongue to be removed from its position beneath the shoulder 11. The case may then be folded to its original position and held by means of the straps 15 and buckles 16.

It is to be understood that I may make my shipping case of any suitable material and also the same may be used for shipping any desirable article, and furthermore, that when it is so desired the central partition used when the device is used for shipping eggs may be removed to give more room on the interior of the case.

While in the foregoing I have shown and described the preferred embodiment of my invention, I wish it to be understood that I may change the specific arrangements of parts without in any way departing from the spirit and scope of my invention.

What I claim is:—

1. A folding egg crate comprising a bottom, a top, a front wall, and a rear wall, ends hingedly secured to the front wall, tongues formed at the opposite extremities of the ends, said tongues being adapted to enter grooves formed in the rear walls, said grooves terminating short of the upper edge of the rear wall, and adapted to form a shoulder against which the upper extremities of the tongues are adapted to abut when the device is in its unfolded position.

2. In a folding egg crate a front wall, end walls hingedly secured at each extremity of said front wall, a bottom hinged to the front wall, a back wall hinged to the bottom, said back having grooves adjacent each end, said grooves terminating short of the upper extremity of the back and forming shoulders, a top hinged to the back, and tongues formed on the end walls adapted to enter the grooves and abut the shoulders.

In testimony whereof I affix my signature in presence of witnesses.

ANDERSON LEE.

Witnesses:
F. W. LITTLE,
J. C. LITTLE,
L. LEWIS.